(12) United States Patent  
Shi et al.

(10) Patent No.: US 12,090,641 B2  
(45) Date of Patent: Sep. 17, 2024

(54) INTELLIGENT GARBAGE SORTING ROBOT

(71) Applicant: Guangdong Ocean University, Zhanjiang (CN)

(72) Inventors: Limei Shi, Zhanjiang (CN); Peng Luo, Zhanjiang (CN); Lei Guo, Zhanjiang (CN); Wenjing Liu, Zhanjiang (CN); Yanzhao Zhu, Dongguan (CN); Jian Liu, Huizhou (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 18/436,027

(22) Filed: Feb. 8, 2024

(65) Prior Publication Data

US 2024/0217119 A1    Jul. 4, 2024

Related U.S. Application Data

(63) Continuation of application No. PCT/CN2023/128232, filed on Oct. 31, 2023.

(30) Foreign Application Priority Data

Dec. 28, 2022  (CN) .......................... 202211699492.9

(51) Int. Cl.
  *B25J 15/06*    (2006.01)
  *B25J 5/00*     (2006.01)
  (Continued)

(52) U.S. Cl.
  CPC .......... *B25J 15/0608* (2013.01); *B25J 5/007* (2013.01); *B25J 9/0009* (2013.01); *B25J 9/1679* (2013.01); *B25J 9/1697* (2013.01); *B25J 15/0071* (2013.01)

(58) Field of Classification Search
  CPC ....... Y10S 901/01; Y10S 901/40; B25J 5/007; B25J 11/0085; B25J 15/0608;
  (Continued)

(56) References Cited

U.S. PATENT DOCUMENTS 3,730,367 A * 5/1973 Heffington ............ B60P 1/5433  
                                                 414/501  
9,665,095 B1 * 5/2017 Romano .............. B25J 11/0085  
(Continued)

OTHER PUBLICATIONS

RobMattingley, "Royalty free Picking Up Leaves premium stock photo" FreeImages, https://www.freeimages.com/premium/picking-up-leaves-751581, accessed Apr. 15, 2024 (Year: 2024).*

(Continued)

*Primary Examiner* — Gerald McClain  
(74) *Attorney, Agent, or Firm* — Zhigang Ma

(57) ABSTRACT

An intelligent garbage sorting robot includes a robot body and a walking base. The robot body is installed on the walking base, and a tool end of the robot body is installed with an executing mechanism. The executing mechanism includes a housing. An electromagnet is slidably disposed in the housing, the electromagnet is connected to a first driving assembly, the first driving assembly is configured to drive the electromagnet to slide, and an end of the housing is fixedly connected to multiple steel needles. Two mechanical claws symmetrically disposed on the walking base, and the two mechanical claws are spaced apart on the walking base. The two mechanical claws are respectively connected to second driving assemblies, and the second driving assemblies are configured to drive the two mechanical claws to move relatively.

14 Claims, 2 Drawing Sheets

(51) Int. Cl.
  *B25J 9/00* (2006.01)
  *B25J 9/16* (2006.01)
  *B25J 15/00* (2006.01)

(58) Field of Classification Search
  CPC .... B25J 15/0071; B25J 9/0009; B25J 9/1679; B25J 9/1697
  See application file for complete search history.

(56) References Cited

U.S. PATENT DOCUMENTS

| | | | |
|---|---|---|---|
| 9,682,483 B1* | 6/2017 | Romano | B25J 11/0085 |
| 9,827,677 B1* | 11/2017 | Gilbertson | B25J 15/0019 |
| 9,827,678 B1* | 11/2017 | Gilbertson | A47L 11/4055 |
| 2013/0310982 A1* | 11/2013 | Scheurer | B25J 5/007 700/263 |
| 2019/0246858 A1* | 8/2019 | Karasikov | A47L 9/2894 |
| 2020/0016770 A1* | 1/2020 | Kamranzadeh | B25J 9/06 |
| 2022/0168893 A1* | 6/2022 | Hamilton | B25J 9/1697 |
| 2022/0193924 A1* | 6/2022 | Hooper | B25J 15/0608 |
| 2022/0322943 A1* | 10/2022 | Chaudhury | G01R 33/288 |

OTHER PUBLICATIONS

CNIPA, Notification to grant patent right for invention in CN202211699492.9, Jul. 6, 2023.
Wanghui, Design and Implementation of Intelligent Garbage Sorting Vehicle Based on Computer Vision, May 2022.
Yue xiaoming, A Deep Learning-Based Robotic Trash Sorting Method, Jul. 2020.
Li haohao, A Visual Sorting System for Recyclable Waste Based on Deep Learning, Jun. 2021.
Li jiankai, Design of visual robot garbage sorting system based on deep learning, Feb. 2021.
Shen xuehao, Research on Key Technologies of Household Service Robot Garbage Sorting Based on Visual Understanding, Jun. 2022.

* cited by examiner

INTELLIGENT GARBAGE SORTING ROBOT

TECHNICAL FIELD

The present disclosure relates to the technical field of garbage sorting, and particularly to an intelligent garbage sorting robot.

BACKGROUND

Due to the huge population base and the rapid growth of population in China, the growth rate of urban garbage in China is fast, and the amount of urban garbage is increasing year by year, so garbage disposal has become an urgent problem. A purpose of the research on the intelligent garbage sorting machine is to solve the problems including low efficiency of manual garbage sorting, high cost of manual sorting, shortage of garbage sorting personnel, inability of manual sorting to meet the requirements of 24-hour high-intensity sorting work, and sorting errors in manual sorting caused by personnel fatigue.

SUMMARY

To solve the above technical problems, the present disclosure provides an intelligent garbage sorting robot to solve the problems in the prior art. To achieve the above purpose, technical solutions of the present disclosure are as follows.

An intelligent garbage sorting robot, includes: a robot body, a walking base, an executing mechanism, two mechanical claws, two second driving assemblies and a visual identifying assembly.

The robot body is installed on the walking base; the executing mechanism is installed on a tool end of the robot body, and the executing mechanism includes: a housing, an electromagnet, a first driving assembly and multiple steel needles; the electromagnet is slidably disposed in the housing; the first driving assembly is connected to the electromagnet, and the first driving assembly is configured to drive the electromagnet to slide; and the multiple steel needles are fixedly connected to an end of the housing; the two mechanical claws are symmetrically disposed on the walking base, and the two mechanical claws are spaced apart on the walking base; the two second driving assemblies are connected to the two mechanical claws, respectively; and the second driving assemblies are configured to drive the two mechanical claws to move relatively; and the visual identifying assembly is configured to identify types of garbage.

In an embodiment, the first driving assembly includes a first servo and a first linkage mechanism; and the first servo is connected to the electromagnet through the first linkage mechanism.

In an embodiment, the first linkage mechanism includes a first rotating rod and a first pulling rod. An end of the first rotating rod is fixedly connected to an output end of the first servo, another end of the first rotating rod is rotatably connected to an end of the first pulling rod, and another end of the first pulling rod is rotatably connected to the electromagnet.

In an embodiment, the housing defines a sliding chamber having an opening, an end of the housing facing away from the opening is installed at the tool end of the robot body, and an end of the electromagnet is slidably disposed in the sliding chamber and rotatably connected to the first pulling rod.

In an embodiment, each second driving assembly has same structures as the first driving assembly.

In an embodiment, the intelligent garbage sorting robot further includes: fixing columns; the two mechanical claws are fixedly disposed on the fixing columns respectively, and the fixing columns are rotatably disposed on the walking base; and each of the second driving assemblies includes: a second servo installed on the walking base, and a second pulling rod rotatably connected to a corresponding one of the two mechanical claws.

In an embodiment, each of the two mechanical claws includes multiple claw-shaped rods arranged in a vertical direction, and an end of each of the multiple claw-shaped rods is fixedly connected to a corresponding one of the fixing columns.

In an embodiment, the intelligent garbage sorting robot further includes:

multiple Mecanum wheels, disposed on the walking base; and multiple electric motors, configured to drive the multiple Mecanum wheels, respectively.

In an embodiment, the visual identifying assembly includes a camera installed on the housing and an identifying terminal. The camera is connected to the identifying terminal.

The intelligent garbage sorting robot of the present disclosure has the following beneficial effects: compared with the prior art, the intelligent garbage sorting robot of the present disclosure can sort and identify garbage, thereby treating metal garbage and non-metal garbage differently. The intelligent garbage sorting robot can take away the metal garbage and the non-metal garbage for recycling, improve garbage sorting efficiency, and reduce urban garbage pollution.

DETAILED DESCRIPTION OF EMBODIMENTS

Figure 1:
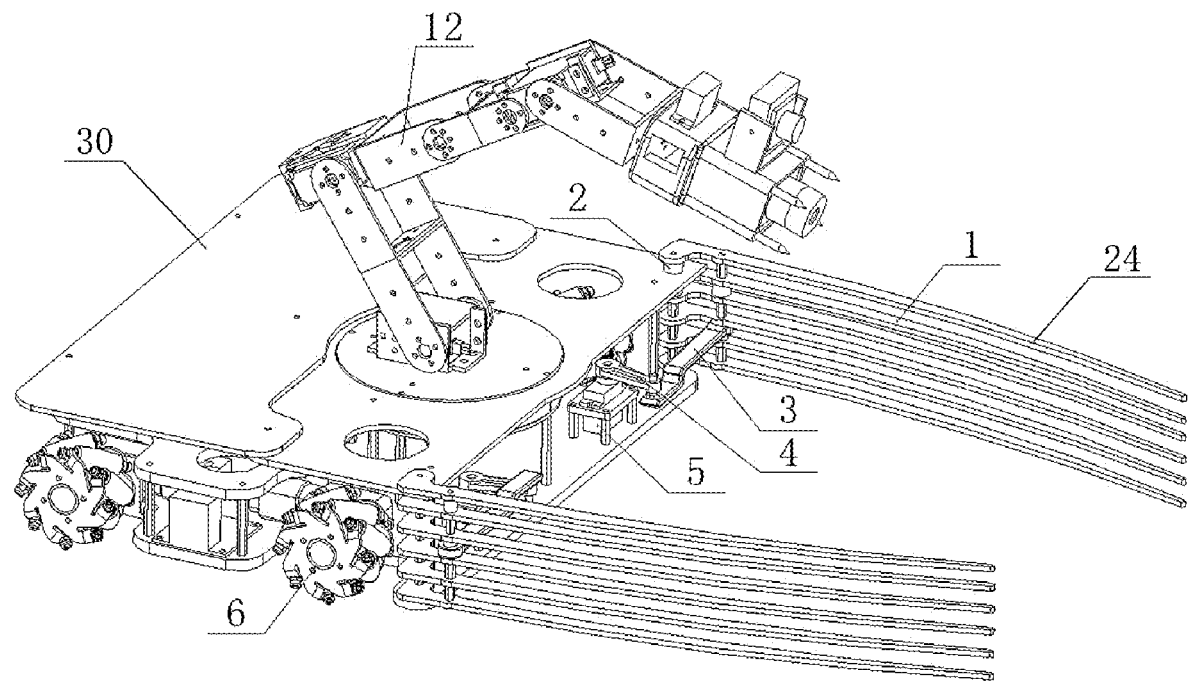
FIG. 1 illustrates a structural schematic diagram of an intelligent garbage sorting robot.
Figure 2:
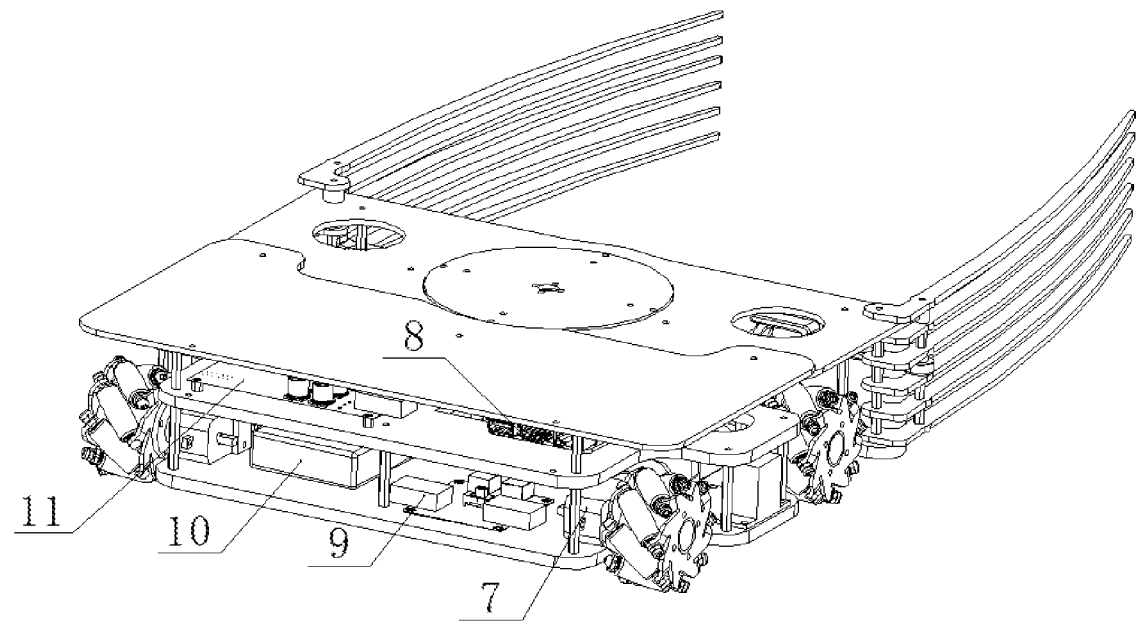
FIG. 2 illustrates a structural schematic diagram of a walking base.
Figure 3:
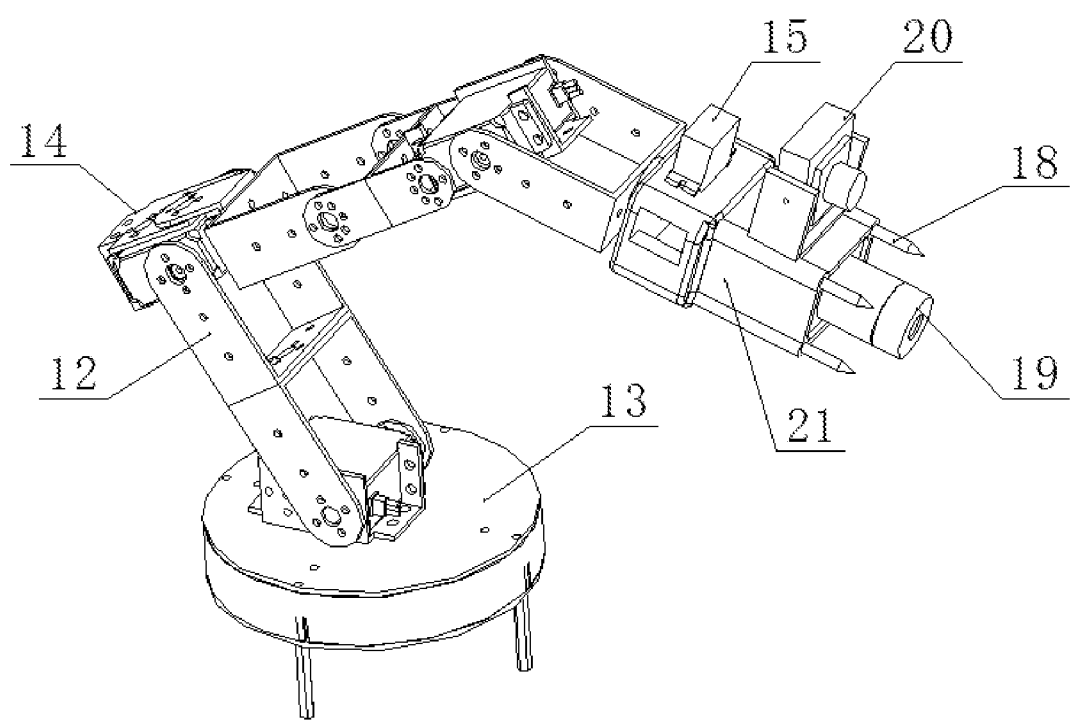
FIG. 3 illustrates a structural schematic diagram of a robot body.
Figure 4:
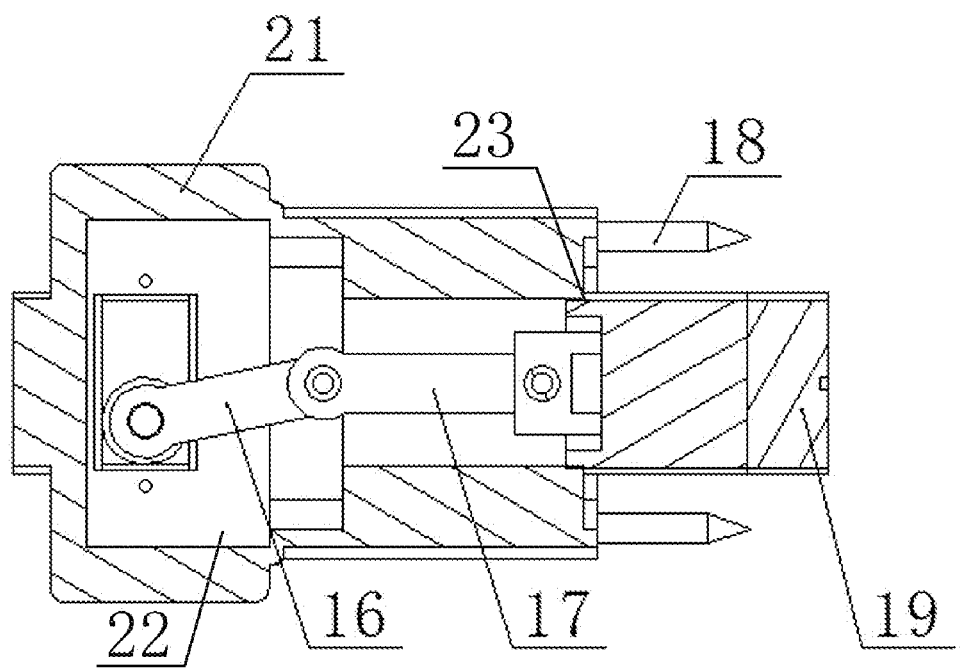
FIG. 4 illustrates a structural schematic diagram of an executing mechanism.

Technical solutions in the embodiments of the present disclosure will be clearly and completely described below with reference to FIGS. 1 to 4 of the embodiments of the present disclosure. Apparently, the described embodiments are only a part of the embodiments, but not all of them. Unless otherwise specified, the technical means used in the described embodiments are conventional means well known to those skilled in the art.

An intelligent garbage sorting robot is provided, and the intelligent garbage sorting robot includes: a robot body 12, a walking base 30, an executing mechanism, two mechanical claws 1, two second driving assemblies, and a visual identifying assembly. The robot body 12 is installed on the walking base 30. The executing mechanism is installed on a tool end of the robot body 12.

The executing mechanism includes: a housing 21, an electromagnet 19, a first driving assembly, and multiple steel needles 18. The electromagnet 19 is slidably disposed in the housing 21. The first driving assembly is connected to the electromagnet 19, and the first driving assembly is configured to drive the electromagnet 19 to slide.

The two second driving assemblies are connected to the two mechanical claws 1, respectively; and the second driving assemblies are configured to drive the two mechanical claws 1 to move relatively. The multiple steel needles 18 are fixedly connected to an end of the housing 21.

The visual identifying assembly is configured to identify types of garbage.

Specifically, the robot body 12 is constructed in a form of a mechanical arm, and multiple axis bodies of the robot body 12 can be connected by servos 14. The bottom of the robot body 12 is installed on a gimbal 13, and the gimbal 13 is installed on the walking base 30. The walking base 30 is configured for driving the entire robot to move. The visual identifying assembly is configured to identify types of garbage, and mainly to identify whether the garbage is large plastic products, metal garbage, plastic bottles, plastic cups, and so on. The body 12, the walking base 30 and the visual identifying assembly are based on the prior art, and thus are not specifically explained.

The two mechanical claws 1 form a clamping assembly, and the two mechanical claws 1 are configured to move the garbage closer to the bottom of the robot body 12. The two mechanical claws 1 are located at a side of the walking base 30 in a walking direction of the walking base 30. The tool end of the robot body 12 is also located on the side of the walking base 30 in the walking direction. Multiple steel needles 18 are distributed at four corners of the end of the housing 21. Preferably, the number of the steel needles 18 are 4.

In a specific implementation method of the intelligent garbage sorting robot, the walking base 30 drives the entire intelligent garbage sorting robot to move to a garbage area on the ground. The second driving assemblies drive the two mechanical claws 1 to move relative to each other, thereby collecting the garbage closer to the bottom of the robot body 12. Then, the visual identifying assembly identifies the types of garbage. When the garbage belongs to metal garbage, the robot body 12 acts, the electromagnet 19 is powered on, and the electromagnet 19 is brought closer to the metal garbage to attract the metal garbage. Then, the walking base 30 drives the entire robot to move to a garbage recycling area. Then, through the action of the robot body 12, the electromagnet 19 is powered off, and the metal garbage falls into the recycling area. When the visual identifying assembly identifies that the garbage belongs to plastic garbage, such as a plastic water cup, the robot body 12 acts to make the steel needles 18 to move. The steel needles 18 are inserted into the plastic water cup to take it away. When the visual identifying assembly identifies that the garbage includes metal garbage and non-metal garbage, the intelligent garbage sorting robot performs two movements to take away the metal garbage and the non-metal garbage in two separate steps. Compared with the prior art, the intelligent garbage sorting robot of the present disclosure can sort and identify garbage, thereby treating metal garbage and non-metal garbage differently. The intelligent garbage sorting robot can take away the metal garbage and the non-metal garbage for recycling, improve garbage sorting efficiency, and reduce urban garbage pollution.

In an embodiment, the first driving assembly includes a first servo 15 and a first linkage mechanism. The first servo 15 is connected to the electromagnet 19 through the first linkage mechanism.

In an embodiment, the first linkage mechanism includes a first rotating rod 6 and a first pulling rod 17. An end of the first rotating rod 16 is fixedly connected to an output end of the first servo 15. Another end of the first rotating rod 16 is rotatably connected to an end of the first pulling rod 17, and another end of the first pulling rod 17 is rotatably connected to the electromagnet 19.

Specifically, the first servo 15 is installed on an upper surface of the housing 21, and an output shaft of the first servo 15 is fixedly connected to the first rotating rod 16. When the first servo 15 drives the first rotating rod 16 to rotate, the first pulling rod 17 slides in the housing 21 and pulls the electromagnet 19 to slide, and the rotational movement of the first servo 15 is converted into a linear movement of the electromagnet 19.

In an embodiment, the housing 21 defines a sliding chamber 22 having an opening 23. An end of the housing 21 facing away from the opening 23 is installed at the tool end of the robot body 12, and an end of the electromagnet 19 is slidably disposed in the sliding chamber 22 and rotatably connected to the first pulling rod 17.

Specifically, the sliding chamber 22 adopts a stepped cavity structure, the first rotating rod 16 located in a larger portion of the sliding chamber 22 to facilitate the rotation of the first rotating rod 16. The electromagnet 19 is matched with a smaller portion of the sliding chamber 22 having a smaller inner diameter, thereby constraining the electromagnet 19 to only move in a straight line.

In an embodiment, the second driving assembly has same structures as the first driving assembly.

Specifically, the second driving assembly includes a second servo 5, a second rotating rod 4, and a second pulling rod 3. In an alternative embodiment, the second servo 5 has the same structure with the first servo 15 of the first driving assembly, the second rotating rod 4 has the same structure with the first rotating rod 16 of the first driving assembly, and the second pulling rod 3 has the same structure with the first pulling rod 17 of the first driving assembly. The second servo 5 is installed on the walking base 30, and an output end of the second servo 5 is rotatably connected to an end of the second rotating rod 4. Another end of the second rotating rod 4 is rotatably connected to an end of the second pulling rod 3, and another end of the second pull rod 3 is rotatably connected to a corresponding one of the two mechanical claws 1. When the second servo 5 rotates, the second rotating rod 4 is rotated to drive the second pulling rod 3, and the second pulling rod 3 pulls the corresponding mechanical claw 1 to rotate.

Two second driving assemblies are set corresponding to the two mechanical claws 1, and the two second driving assemblies are symmetrically distributed, so that the two mechanical claws 1 rotate relative to each other.

In an embodiment, the intelligent garbage sorting robot further includes fixing columns 2. The two mechanical claws 1 are fixedly disposed on the fixing columns 2 respectively, and the fixing columns 2 are rotatably disposed on the walking base 30. The second servo 5 of each second driving assembly is installed on the walking base 30, and the second pulling rod 3 of each second driving assembly is rotatably connected to a corresponding one of the two mechanical claws 1.

In an embodiment, each of the two mechanical claws 1 includes multiple claw-shaped rods 24 arranged in a vertical direction, and an end of each of the multiple claw-shaped rods 24 is fixedly connected to a corresponding one of the fixing columns 2.

Specifically, each of the fixing columns 2 is vertically arranged, and each of the multiple claw-shaped rods 24 is a long arc-shaped rod. The multiple claw-shaped rods 24 form a claw-shaped structure of a corresponding one of the two mechanical claws 1.

In an embodiment, the intelligent garbage sorting robot further includes multiple Mecanum wheels 6 disposed on the walking base 30 and multiple electric motors 7. The multiple electric motors 7 are configured to drive the multiple Mecanum wheels 6, respectively.

Specifically, the multiple Mecanum wheels 6 and the electric motors 7 are configured to facilitate the walking base 30 changing directions. Each of the multiple Mecanum wheels 6 is connected to a corresponding one of the electric motors 7, and the electric motors 7 are installed on the walking base 30.

In an embodiment, the visual identifying assembly includes a camera 20 installed on the housing 21 and an identifying terminal 8. The camera 20 is connected to the identifying terminal 8.

Specifically, the identifying terminal 8 can be a type of microcomputer. Preferably, the identifying terminal 8 is Raspberry Pi. The identifying terminal 8 is installed on the walking base 30, and the identifying terminal 8 is configured to achieve intelligent identification of garbage. The identifying terminal 8 is connected to a main control board 11. The main control board 11 is connected to the robot body 2, the first driving assembly, and the second driving assemblies. The main control board 11 is configured to intelligently control the movement of the robot body 2, the clamping of the two mechanical claws 1, and the sliding of the electromagnet 19.

In an embodiment, the identifying terminal 8 can be a backend computer, and the backend computer is wirelessly connected to the camera 20 remotely. The backend computer can allow relevant personnel to remotely view the camera 20, thereby achieving manual identification and garbage sorting. The relevant personal can interact with the main control board 11 through the backend computer to control the movement of the robot body 12 and the clamping of the two mechanical claws 1.

In addition, the intelligent garbage sorting robot further includes a motor controller 9 and a battery 10 which are disposed on the walking base 30. The motor controller 9 is connected to the main control board 11 and the electric motors 7 to achieve intelligent control of changing directions and driving. The battery 10 is connected to various components of the intelligent garbage sorting robot to provide power.

The above embodiments are only a description of exemplary embodiments of the present disclosure and do not limit a protection scope of the present disclosure. Without departing from the design spirit of the present disclosure, all changes, modifications, and replacements made by those skilled in the art to the technical solutions of the present disclosure should fall within the protection scope defined in the claims of the present disclosure.

What is claimed is:

1. An intelligent garbage sorting robot, comprising:
    a robot body (12);
    a walking base (30); wherein the robot body (12) is installed on the walking base (30);
    an executing mechanism, installed on a tool end of the robot body (12); wherein the executing mechanism comprises:
        a housing (21);
        an electromagnet (19), slidably disposed in the housing (21);
        a first driving assembly, connected to the electromagnet (19); wherein the first driving assembly is configured to drive the electromagnet (19) to slide; and
        a plurality of steel needles (18), fixedly connected to an end of the housing (21);
    two mechanical claws (1), symmetrically disposed on the walking base (30); wherein the two mechanical claws (1) are spaced apart on the walking base (30);
    two second driving assemblies, connected to the two mechanical claws (1), respectively;
    wherein the second driving assemblies are configured to drive the two mechanical claws (1) to move relatively; and
    a visual identifying assembly, configured to identify types of garbage;
    wherein the housing (21) defines a sliding chamber (22) having an opening (23), the electromagnet (19) is slidably disposed in the sliding chamber (22) through the opening (23), the plurality of steel needles (18) are directly connected with the end of the housing (21), and an end of the electromagnet (19) facing away from the housing (21) is spaced from the plurality of steel needles (18) and surrounded by the plurality of steel needles (18); and
    wherein in response to the visual identifying assembly identifying that the garbage is metal garbage, the electromagnet (19) is configured to slide, under driving of the first driving assembly, to make the end of the electromagnet (19) facing away from the housing (21) protrude beyond the plurality of steel needles (18) to attract the metal garbage; and in response to the visual identifying assembly identifying that the garbage is non-metal garbage, the electromagnet (19) is configured to slide, under the driving of the first driving assembly, to make ends of the plurality of steel needles (18) facing away from the housing protrude beyond the end of the electromagnet (19) facing away from the housing (21), and the plurality of steel needles (18) are configured to insert into the non-metal garbage.

2. The intelligent garbage sorting robot as claimed in claim 1, wherein the first driving assembly comprises: a first servo (15) and a first linkage mechanism; and the first servo (15) is connected to the electromagnet (19) through the first linkage mechanism.

3. The intelligent garbage sorting robot as claimed in claim 2, wherein the first linkage mechanism comprises a first rotating rod (6) and a first pulling rod (17), an end of the first rotating rod (16) is fixedly connected to an output end of the first servo (15), another end of the first rotating rod (16) is rotatably connected to an end of the first pulling rod (17), and another end of the first pulling rod (17) is rotatably connected to the electromagnet (19).

4. The intelligent garbage sorting robot as claimed in claim 3, wherein an end of the housing (21) facing away from the opening (23) is installed at the tool end of the robot body (12), and an end of the electromagnet (19) is slidably disposed in the sliding chamber (22) and rotatably connected to the first pulling rod (17).

5. The intelligent garbage sorting robot as claimed in claim 3, wherein each of the second driving assemblies has same structures as the first driving assembly.

6. The intelligent garbage sorting robot as claimed in claim 5, wherein the intelligent garbage sorting robot further comprises: fixing columns (2); the two mechanical claws (1) are fixedly disposed on the fixing columns (2) respectively, and the fixing columns (2) are rotatably disposed on the walking base (30); and each of the second driving assemblies comprises: a second servo (5) installed on the walking base (30), and a second pulling rod (3) rotatably connected to a corresponding one of the two mechanical claws (1).

7. The intelligent garbage sorting robot as claimed in claim 6, wherein each of the two mechanical claws (1) comprises a plurality of claw-shaped rods (24) arranged in a vertical direction, and an end of each of the plurality of claw-shaped rods (24) is fixedly connected to a corresponding one of the fixing columns (2).

8. The intelligent garbage sorting robot as claimed in claim 1, wherein the intelligent garbage sorting robot further comprises:
   a plurality of Mecanum wheels (6), disposed on the walking base (30); and
   a plurality of electric motors (7), configured to drive the plurality of Mecanum wheels (6), respectively.

9. The intelligent garbage sorting robot as claimed in claim 1, wherein the visual identifying assembly comprises: a camera (20) installed on the housing (21) and an identifying terminal (8); and the camera (20) is connected to the identifying terminal (8).

10. The intelligent garbage sorting robot as claimed in claim 3, wherein the sliding chamber (22) is a stepped cavity; the first rotating rod (16) and the first pulling rod (17) are disposed in the stepped cavity, and the electromagnet (19) is constrained by the stepped cavity; and the first servo (15) is installed on an upper surface of the housing (21) and exposed outside the housing (21).

11. The intelligent garbage sorting robot as claimed in claim 10, wherein the visual identifying assembly comprises: a camera (20), the camera is installed on the upper surface of the housing (21) and located at a side of the first servo (15) facing towards the plurality of steel needles (18).

12. The intelligent garbage sorting robot as claimed in claim 1, wherein a number of the plurality of steel needles (18) is four, the four steel needles (18) are arranged at four corners of the end of the housing (21), and the electromagnet (19) is arranged at a center of the end of the housing (21).

13. The intelligent garbage sorting robot as claimed in claim 1, wherein each of the second driving assemblies comprises a second servo (5), a second rotating rod (4), and a second pulling rod (3); the second servo (5) is installed on the walking base (30), and an output end of the second servo (5) is rotatably connected to an end of the second rotating rod (4), another end of the second rotating rod (4) is rotatably connected to an end of the second pulling rod (3), and another end of the second pull rod (3) is rotatably connected to the respective mechanical claw (1).

14. An intelligent garbage sorting robot, comprising:
   a visual identifying assembly;
   a walking base (30);
   a robot body (12), installed on the walking base (30);
   an executing mechanism, installed on a tool end of the robot body (12); wherein the executing mechanism comprises:
   a housing (21);
   a first servo (15), disposed on an upper surface of the housing (21);
   a first linkage mechanism, connected with the first servo (15) and disposed inside the housing (21);
   an electromagnet (19), wherein a first end of the electromagnet (19) is disposed inside the housing (21) and connected with the first linkage mechanism, and a second end of the electromagnet (19) is exposed outside the housing (21);
   a plurality of steel needles (18), directly connected to an end of the housing (21) which is perpendicular to the upper surface of the housing (21); wherein the plurality of steel needles (18) are spaced from the electromagnet (19 and surround the electromagnet (19);
   two mechanical claws (1), symmetrically disposed on two sides of the walking base (30); and
   two second driving assemblies, connected to the two mechanical claws (1), respectively;
   wherein the walking base (30) is configured to drive the intelligent garbage sorting robot to move to a garbage area; the two second driving assemblies are configured to drive the two mechanical claws (1) to move relative to each other to collect garbage; the visual identifying assembly is configured to identify a type of the garbage; in response to the visual identifying assembly identifying that the garbage is metal garbage, the electromagnet (19) is powered on, and configured to slide, under driving of the first servo (15) and the first linkage mechanism, to make an end of the electromagnet (19) facing away from the housing (21) protrude beyond the plurality of steel needles (18) to attract the metal garbage; the walking base (30) is further configured to drive the intelligent garbage sorting robot to move to a garbage recycling area, and the electromagnet (19) is powered off after the intelligent garbage sorting robot is moved to the garbage recycling area, thereby to make the metal garbage fall into the garbage recycling area; and in response to the visual identifying assembly identifying that the garbage is non-metal garbage, the electromagnet (19) is configured to slide, under the driving of the first servo (15) and the first linkage mechanism, to make ends of the plurality of steel needles (18) facing away from the housing protrude beyond the end of the electromagnet (19) facing away from the housing (21), and the plurality of steel needles (18) are configured to insert into the non-metal garbage.

* * * * *